Patented Oct. 3, 1933

1,929,357

UNITED STATES PATENT OFFICE 1,929,357

BATTERY PASTE EXTENDER AND PROCESS OF MAKING SAME

James O. Johnstone, Hammond, Ind., assignor to Chemical & Pigment Co., Inc., a corporation of Maryland No Drawing. Application October 31, 1930
Serial No. 492,624

11 Claims. (Cl. 136—27)

This invention relates to an improved battery paste extender and a process for improving the battery pastes employed in making electrodes of storage batteries or accumulators of the lead-acid cell type and has particular reference to the improvement of pastes for cathode plates of such batteries or accumulators.

It is well-known in this art that beneficial effects may be derived by adding fibers and other inert materials to the lead and lead compounds in battery pastes, which results in a relatively porous electrode and affords a largely increased surface of active material relative to the weight of the lead and lead compounds in the electrodes. These added materials are either insoluble in the strong sulphuric acid of the battery or else dissolve without injury to the battery through objectionable chemical reaction. However, certain disadvantages manifest themselves in the use of the materials which have been heretofore employed for this purpose.

Among the objects of this invention is the preparation of a substance which overcomes the disadvantages incident to the materials heretofore employed and which gives a more efficient electrode when incorporated in the battery paste. A more specific object of this invention is to provide an extending substance by precipitating a barium salt in the body of cellulosic material and thereby obtain proper distribution of the constituent substances and a more serviceable and chemically active product for use as a battery paste extender.

Other, further, and more specific objects of this invention will become readily apparent to persons skilled in the art from a consideration of the following description.

A specific example of carrying out my process is as follows:

To 250 parts by weight of some suitable form of cellulose, such as cotton, cotton waste, cotton linters, sawdust or other wood fiber, etc., there is added a solution of 100 parts of BaS in 500 parts of water. To this mass there is added, with constant stirring, 100 parts of $Na_2SO_4$ in 400 parts of water. The resulting pulp is completely dried, but not scorched, and then finely pulverized. This dry powdery material may be used for the battery paste extender without further treatment, but if desired, the alkaline salts may be first leached out with water.

In making a paste for the negative battery plate, the dry constituents may consist of 0.5% to 1.0% of the pulverized material prepared by my process set forth above, litharge 98.75% to 99.25% and lampblack 0.25%. These materials are brought to the desired pasty consistency, in the customary manner, by mixing with dilute sulphuric acid.

In carrying out my process, the sodium sulphate solution may be first added to the cellulose material, if desired, and the barium sulphide solution subsequently added, with constant stirring.

Other barium compounds, such as barium hydrate or barium nitrate, may be used in lieu of the barium sulphide, and other soluble salts, which will react with the soluble barium compound to precipitate an insoluble barium compound, for example $Na_2CO_3$, may be used in lieu of the $Na_2SO_4$.

The product produced by my process when employed as a battery paste extender is a very much more efficient agent than a mere mixture of $BaSO_4$ and cellulose fibers. During the treatment with the barium sulphide and sodium sulphate solutions, the cellulose swells up and takes on a gel structure. The $BaSO_4$ is precipitated to a large extent in the body of the gel. Under the action of the strong alkaline liquors at the temperature of the treatment, the cellulose is changed in its chemical and physical structures as when mercerized. It is largely converted into hydrocellulose.

My new extender is readily distributed in the paste and will be easily migrated by the acid in the normal functioning of the battery. During the charge and discharge of the battery, the barium sulphate tends to crystallize and the crystals grow into larger sizes. The hydrocellulose operates to retard this crystallization and crystal growth of the barium sulphate, thus producing an effect which is quite different from the mere algebraic sum of the benefits produced by each.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a process of making a battery paste extender for a lead-acid cell electrode, mercerizing cellulose and forming a jelly-like structure thereof by soaking cellulose fibrous material with a solution of a barium compound and adding a solution of a substance which reacts with the soluble barium compound to form an insoluble barium compound and water-soluble alkaline compound and precipitating the insoluble barium compound in the mercerized fibers.

2. In a process of making a battery paste extender for a lead-acid cell electrode, mercerizing cellulose and forming a jelly-like structure thereof by soaking cellulose fibrous material with a solution of a barium compound and adding a sulphate of an alkali metal and precipitating barium sulphate in the mercerized fibers.

3. In a process of making a battery paste extender for a lead-acid cell electrode, mercerizing cellulose and forming a jelly-like structure thereof by soaking cellulose fibrous material with barium sulphide solution and adding a sulphate of an alkali metal to the solution and precipitating barium sulphate in the mercerized fibers.

4. In a process of making a battery paste extender for a lead-acid cell electrode, mercerizing sawdust and forming a jelly-like structure thereof by soaking with barium sulphide solution and adding a solution of a water-soluble sulphate which forms with barium sulphide a water-soluble sulphide of alkaline reaction and precipitating barium sulphate in the mercerized sawdust fibers.

5. In a process of making a battery paste extender for a lead-acid cell electrode, mercerizing sawdust and forming a jelly-like structure thereof by soaking with barium sulphide solution and adding sodium sulphate to the solution and precipitating barium sulphate in the mercerized sawdust fibers.

6. In a process of making a battery paste extender for a lead-acid cell electrode, mercerizing sawdust and forming a jelly-like structure thereof by soaking with barium sulphide solution and adding sodium sulphate to the solution, precipitating barium sulphate in the mercerized sawdust fibers, drying and pulverizing the mass and then leaching the soluble substances therefrom.

7. In a process of making a battery paste extender for a lead-acid cell electrode, forming barium sulphate approaching colloidal sizes by precipitating barium sulphate in the presence of mercerized cellulose having a jelly-like structure.

8. A battery paste for a lead-acid cell electrode having incorporated therein an extender comprising mercerized cellulose and finely divided barium sulphate precipitated in the presence of said mercerized cellulose.

9. A battery paste for a lead-acid cell electrode having incorporated therein an extender comprising finely-divided mercerized cellulose, and finely-divided barium sulphate.

10. In a process of making a battery paste for a lead-acid cell electrode, forming an extender by soaking cellulose fibrous material with an alkaline solution of a barium compound, mercerizing the cellulose and forming a jelly-like structure thereby, and precipitating an insoluble barium compound in the mercerized fibers by means of a solution of a substance which reacts with the soluble barium compound to form an insoluble barium compound and a water-soluble alkaline compound and then adding to the extender thus formed the active material of the battery paste.

11. In a process of making a battery paste for a lead-acid cell electrode, forming an extender by soaking sawdust with barium sulphide solution and a water-soluble sulphate salt which forms with barium sulphide a water-soluble sulphide and barium sulphate, mercerizing the sawdust thereby and precipitating barium sulphate in the mercerized sawdust fibers and then adding to the extender thus formed the active material of the battery paste.

JAMES O. JOHNSTONE.